United States Patent [19]
Starke

[11] 3,862,642
[45] Jan. 28, 1975

[54] AIR BLEEDING DEVICE
[75] Inventor: John H. Starke, New City, N.Y.
[73] Assignee: The Raymond Lee Organization, Inc., New York, N.Y. ; a part interest
[22] Filed: Dec. 19, 1973
[21] Appl. No.: 425,960

[52] U.S. Cl. .............................................. 137/354
[51] Int. Cl. .............................................. F16l 3/00
[58] Field of Search ..................... 137/344, 351, 354

[56] References Cited
UNITED STATES PATENTS
2,881,789  4/1959  Finazzo ............................. 137/354

Primary Examiner—Henry T. Klinksiek
Attorney, Agent, or Firm—Daniel Jay Tick

[57] ABSTRACT

An air bleeding device for a hydraulic system having a cylinder with a bleeder cap comprises a street elbow having one end threadedly coupled to the cylinder. A hydraulic high pressure hose is threadedly coupled at one end to the other end of the elbow. An L-type fitting bracket is adapted to be affixed to a supporting surface and is threadedly coupled to the other end of the hose. A high pressure liquid hand valve is threadedly coupled at one end to the other end of the bracket.

2 Claims, 3 Drawing Figures

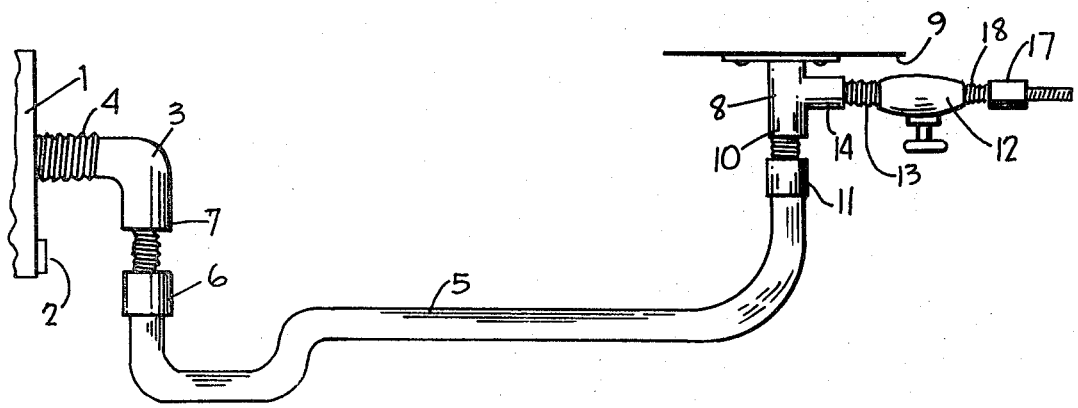
FIG. 1.
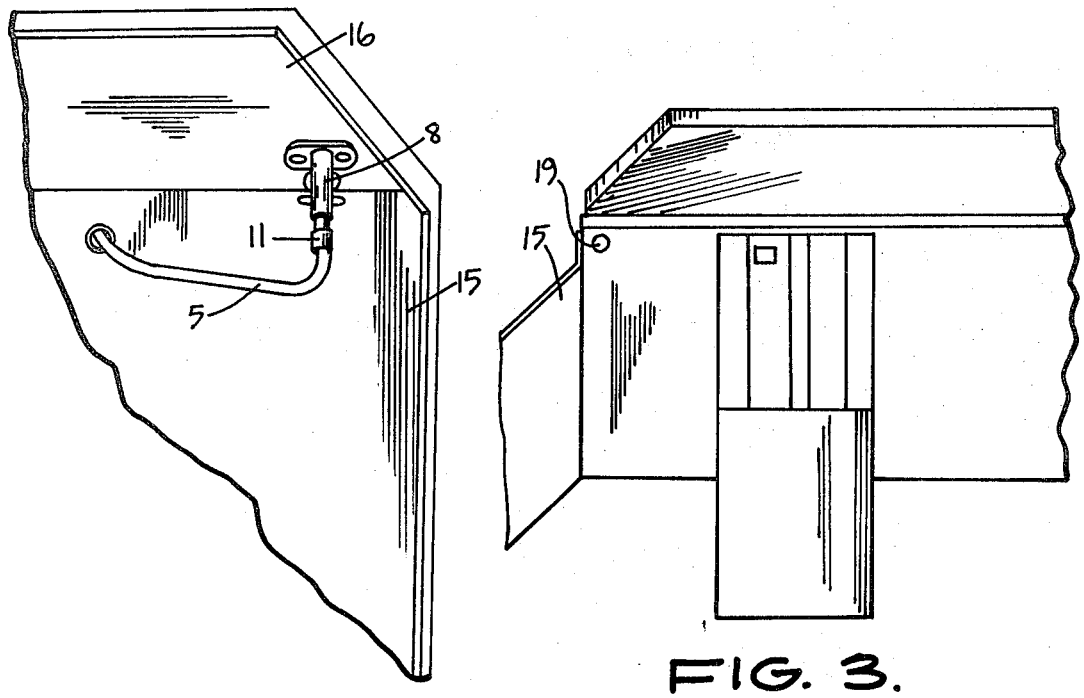
FIG. 2.
FIG. 3.

AIR BLEEDING DEVICE

DESCRIPTION OF THE INVENTION

The present invention relates to an air bleeding device. More particularly, the invention relates to an air bleeding device for a hydraulic system having a cylinder with a bleeder cap.

Objects of the invention are to provide an air bleeding device of simple structure, which is inexpensive in manufacture, is simple, easy and convenient to use and bleeds air from the cylinder of a hydraulic system, and more specifically that of the hydraulic system of a dump truck, with facility, convenience, rapidity, effectiveness, efficiency and reliability.

In order that the invention may be readily carried into effect, it will now be described with reference to the accompanying drawing, wherein:

FIG. 1 is a view of an embodiment of the air bleeding system of the invention;

FIG. 2 is a schematic diagram of part of the air bleeding system of the invention on a dump truck; and FIG. 3 is a schematic diagram of part of a dump truck utilizing the air bleeding system of the invention.

In the FIGS., the same components are identified by the same reference numerals.

The air bleeding device of the invention is for a hydraulic system having a cylinder 1 with a bleeder cap 2 (FIG. 1).

The air bleeding device of the invention comprises a street elbow 3 having one end 4 threadedly coupled to the cylinder 1 (FIG. 1).

A hydraulic high pressure hose 5 is threadedly coupled at one end 6 to the other end 7 of the elbow 3 (FIG. 1).

An L-type fitting bracket 8 is adapted to be affixed to a supporting surface 9 and is threadedly coupled at one end 10 to the other end 11 of the hose 5 (FIG. 1).

A high pressure liquid hand valve 12 is threadedly coupled at one end 13 to the other end 14 of the bracket 8 (FIG. 1).

The air bleeding device of the invention is for a hydraulic system of a dump truck having a body 15 (FIGS. 2 and 3). The bracket 8 is then affixed to the underside 16 of the body 15 (FIG. 2). An outlet 17 (FIG. 1) is coupled to the other end 18 of the valve 12 and extends into the body of the truck via a bore 19 (FIG. 3).

While the invention has been described by means of a specific example and in a specific embodiment, I do not wish to be limited thereto, for obvious modifications will occur to those skilled in the art without departing from the spirit and scope of the invention.

I claim:

1. An air bleeding device for a hydraulic system having a cylinder with a bleeder cap, said air bleeding device comprising a street elbow having one end threadedly coupled to the cylinder;

a hydraulic high pressure hose threadedly coupled at one end to the other end of the elbow;

an L-type fitting bracket adapted to be affixed to a supporting surface and threadedly coupled at one end to the other end of the hose; and a high pressure liquid hand valve threadedly coupled at one end to the other end of the bracket.

2. An air bleeding device as claimed in claim 1, wherein the device is for a hydraulic system of a dump truck having a body and the bracket is adapted to be affixed to the underside of the body, and further comprising an outlet coupled to the other end of the valve and extending into the body of the truck.

* * * * *